United States Patent
Castillo et al.

[11] Patent Number: 5,836,061
[45] Date of Patent: Nov. 17, 1998

[54] CABLE END ANCHORING NIPPLE AND METHODS OF CONSTRUCTING AND UTILIZING SAME

[75] Inventors: Gilbert Castillo, Dublin; Masahiro Izumi, Westerville, both of Ohio

[73] Assignee: Honda Giken Kogyo Kabushiki Kaisha, Tokyo, Japan

[21] Appl. No.: 900,375

[22] Filed: Jul. 12, 1997

[51] Int. Cl.[6] ..................................................... F16G 11/00
[52] U.S. Cl. ........................ 24/702; 24/115 R; 24/136 L; 24/701; 403/353
[58] Field of Search ..................... 24/702, 701, 136 L, 24/115 R, 115 L, 115 M, 265 AL, 666; 403/353

[56] References Cited

U.S. PATENT DOCUMENTS

| | | | |
|---|---|---|---|
| 3,239,900 | 3/1966 | Bottoms | 24/115 R |
| 3,399,605 | 9/1968 | Landers et al. | 403/353 |
| 4,178,656 | 12/1979 | MacFarlane | 24/702 |
| 4,850,084 | 7/1989 | Iwasaki . | |
| 5,246,303 | 9/1993 | Trilla et al. | 24/702 |

FOREIGN PATENT DOCUMENTS

| | | | |
|---|---|---|---|
| 0804297 | 4/1951 | Germany | 24/701 |
| 0017444 | 1/1987 | Japan | 24/136 L |

Primary Examiner—Victor N. Sakran
Attorney, Agent, or Firm—Carrier, Blackman & Associates, P.C.; Joseph P. Carrier; William D. Blackman

[57] ABSTRACT

An anchoring structure for a cable end comprises a securing body having a recess defined therein and having an opening defined through an outer surface thereof and extending into the recess, an anchoring nipple for being fixed to the end of the cable and fitted into the recess of the securing body through the opening for being operatively connected to the securing body. The nipple is a unitary member with a first substantially cylindrical half portion having an opening defined in a side wall thereof for receiving the end of the cable, and a second substantially cylindrical half portion joined side-by-side to the first substantially cylindrical half portion such that the nipple is substantially 8-shaped when viewed towards ends of the half portions. The recess has an oblong shape with a height and width only slightly larger than the diameter and lateral width of the substantially cylindrical half portions of the nipple, respectively, and with a longitudinal length somewhat larger than the longitudinal length of the nipple. With such structures, the nipple occupies a substantially maximum space within the recess when operatively disposed therein, which is desirable to prevent the nipple from rotating within the recess, and also desirably insures a large contact surface area between the nipple and the securing body when the nipple is operatively disposed therein so as to minimize the average contact pressure between a given point of the nipple and the securing body.

19 Claims, 2 Drawing Sheets

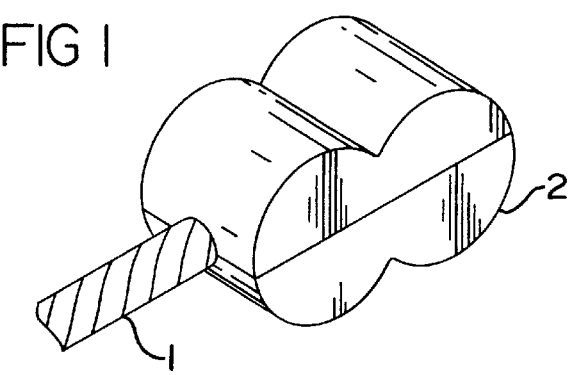
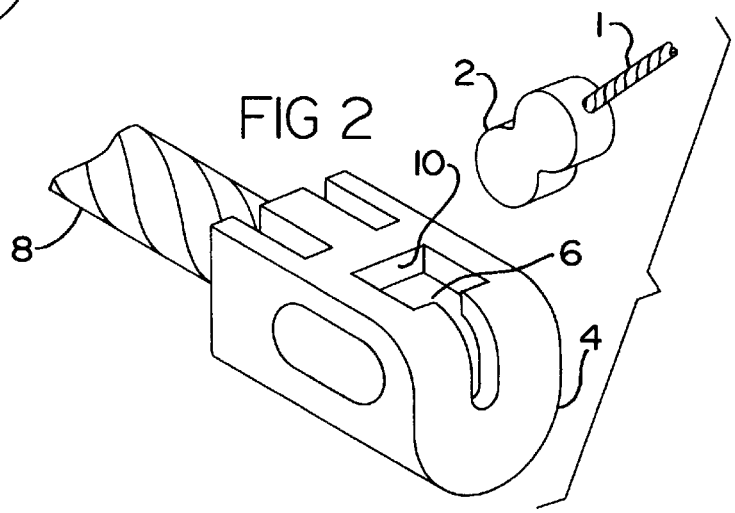
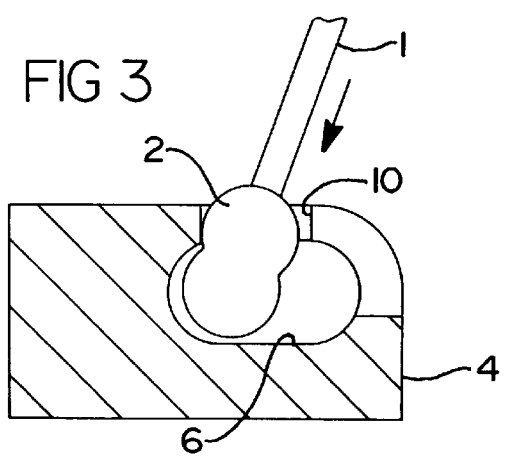
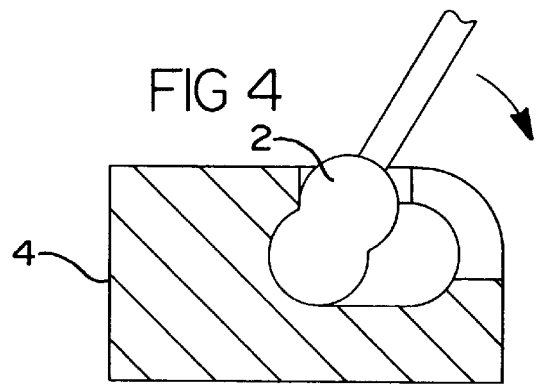
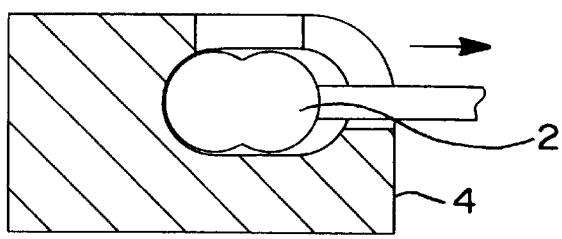
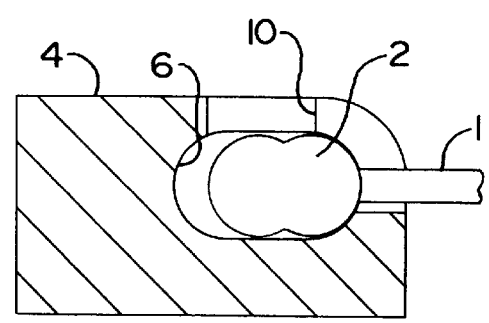

CABLE END ANCHORING NIPPLE AND METHODS OF CONSTRUCTING AND UTILIZING SAME

FIELD OF THE INVENTION

The present invention pertains to an anchoring nipple for the end of the cable, such as an actuator cable. More particularly, the present invention pertains to such an anchoring nipple for a cable end which is shaped to be received in a recessed portion of an actuatable or an actuating mechanism, such as an electronic cruise control unit with a relatively large surface contact therebetween so that contact pressure is distributed over a relatively large surface area and so that the nipple cannot rotate within the recess.

DESCRIPTION OF RELEVANT ART

In the art of cables such as actuator cables, control cables, etc., there are known structures and devices for connecting the end of a cable or wire to an actuating or actuatable mechanism such that the cable may drive or be driven by the mechanism. For example, such structures are disclosed in U.S. Pat. No. 4,850,084 (Iwasaki). As disclosed by Iwasaki, such a structure typically includes an anchoring nipple fixed to the end of the cable and a recessed portion of an actuatable or actuating mechanism shaped to securely receive the end of the cable and the anchoring nipple therein. The recessed portion has a convoluted opening defined through plural sides thereof and extending into a recess therein. The recess is shaped for receiving the nipple and cable end, and the opening is smaller in cross-section than the recess so that the nipple must be manipulated to fit through the opening into the recess. Particularly, the nipple is shaped such that it may be easily inserted into the recessed portion through the opening when the nipple is oriented in one direction, and is securely maintained within the recessed portion when the nipple is rotated toward another direction, typically at a relatively large angle from the first direction, such as 90°. Iwasaki discloses three different shapes of his anchoring nipple in his FIGS. 1, 5 and 6, and the recessed portion of the securing body may be varied according to the shape of the nipple.

Although Iwasaki discloses several different nipple shapes, each of such shapes is disadvantageous. Particularly, each of the three shapes disclosed by Iwasaki, i.e., a circular disk, a U-shaped disk, and a cylinder, results in a relatively small area of surface contact between the nipple and the recessed portion of the securing body, and hence, creates high pressure contact points between the nipple and the securing body. For example, in relation to be circular and U-shaped nipples of Iwasaki, two high pressure contact points are created on the nipple immediately adjacent the cable, due to the concave nature of the outer surface of the nipple. Additionally, all of the nipple shapes disclosed by Iwasaki may rotate within the recessed portion of the securing body, which makes it possible to load the actuatable or actuating mechanism to which the cable is connected incorrectly, creating high pressure zones.

Two other known anchoring nipple shapes are shown in FIGS. 7a and 8a of the accompanying drawings. The nipple in FIG. 7a has a semi-spherical end portion disposed inwardly on the end of the cable, while the nipple in FIG. 8a has a semi-cylindrical portion disposed inwardly on the end of the cable. The overall shape of the nipple in FIG. 7a permits the nipple to rotate freely within the recessed portion of a secured body, and due to the semi-spherical shape of the inner portion thereof it, again, creates two high pressure contact points with surfaces of the recessed portion of the securing body where the cable passes therethrough, as indicated in FIG. 7b. On the other hand, although the anchoring nipple of FIG. 8a has an increased surface area in contact with the securing body when the nipple is aligned as shown in FIG. 8b, the nipple is also free to rotate within the recessed portion of the securing body such that it may also become aligned as shown in FIG. 8c in which the nipple again has a reduced surface area in contact with the securing body, creating high pressure contact zones.

The present invention has been developed to overcome the problems and disadvantages associated with known anchoring structures for cable ends, including those discussed above.

SUMMARY OF THE INVENTION

According to the invention there is provided an anchoring structure for a cable end comprising: an anchoring body having a recess defined therein and having an opening defined through an outer surface thereof and extending into the recess; and an anchoring nipple for being fixed to the cable end and fitted into the recess of the anchoring body through the opening. The opening has a cross-sectional shape smaller than the recess; and the nipple comprises a unitary member with first and second substantially cylindrical half portions joined side-by-side such that the unitary member is substantially 8-shaped when viewed toward ends of the half portions.

Preferably the recess has an oblong or substantially elliptical cross section with rounded ends which are shaped to substantially fully engage rounded ends of the anchoring nipple; the substantially cylindrically half portions of the nipple have a diameter slightly smaller than a height of the recess and a lateral width at least as large as the diameter thereof such that the nipple cannot rotate about its longitudinal axis when fully disposed within the recess; and an axial length of the recess is longer than an axial length of the anchoring nipple by a distance less than the diameter of the substantially cylindrical half portions such that the nipple is axially slidable within the recess.

Still further according to the invention, it is preferred that the opening will have a larger portion for receiving the nipple therethrough and a smaller portion for receiving the cable end therethrough; and the larger portion of the opening will be shaped similar to and slightly larger than a cross-sectional shape of one of the substantially cylindrical half portions along a longitudinal axis of the substantially cylindrical portion. With such preferred structure of the recess, the opening and the nipple, the nipple may be inserted into the recess by initially inserting a front one of the half portions into the recess through the opening such that a rear one of the half portions extends into the opening, and then rotating the nipple about a longitudinal axis of the front half portion so that the rear half portion pivots downwardly into the recess through the larger part of the opening and the cable end pivots downwardly into the small portion of the opening.

According to the invention, there is also provided an anchoring nipple for being fixed to the end of a cable which is shaped to be operatively disposed in a recess defined in a securing body, the anchoring nipple comprising a unitary member with two substantially cylindrical half portions joined side-by-side such that the nipple is substantially 8-shaped when viewed toward ends of the half portions. Such anchoring nipple desirably distributes contact pressure along relatively large contact surface of the securing body defining the recess and is non rotatable along its longitudinal axis while disposed within the recess.

It is an object of the present invention to provide an anchoring nipple for the end of a cable such as an actuating cable, for anchoring the end within a recess defined in the securing body such as an actuating or actuatable mechanism, and wherein the shape of the anchoring nipple maximizes the area of surface contact between the nipple and the surface of the securing body defining the recess so as to minimize average contact pressure on the contact surface of the nipple.

It is another object of the invention to provide such an anchoring nipple which cannot rotate about its longitudinal axis when operatively disposed within the recess of the anchoring body, and which cannot easily be dislodged from its operative position within the recess of the securing body.

It is still another object of the invention to provide such an anchoring nipple having a simple, inexpensive structure.

It is yet another object of the invention to provide a securing structure for a cable end including an anchoring nipple which can be easily inserted into and withdrawn from an anchoring recess in a securing body, and wherein the nipple cannot easily be dislodged from its operative position within the recess of the securing body by normal operative movements of the cable and the securing body.

Other objects, advantages, and salient features of the invention will be apparent from the following detailed description which, when viewed in conjunction with the appended drawings, discloses a presently preferred embodiment of the invention.

BRIEF DESCRIPTION OF THE DRAWINGS

FIG. 1 is a perspective view of an anchoring nipple according to the presently preferred embodiment of the invention shown attached to the end of a cable.

FIG. 2 an exploded, perspective view of the nipple of FIG. 1 and an anchoring body into which it may be fitted.

FIGS. 3–6 are a series of partly-sectional side views showing a procedure of inserting the nipple into the recess of the securing body, in which:

FIG. 3 shows the nipple as it is initially inserted into the recess through an opening on an upper surface of the securing body;

FIG. 4 shows the nipple as it is rotated downwardly, fully into the recess;

FIG. 5 shows the nipple in engagement with the rear end of the recess; and

FIG. 6 shows the nipple after it is slid forwardly from the position of FIG. 5 to its operative position in engagement with the front end of the recess.

DETAILED DESCRIPTION OF THE PREFERRED EMBODIMENTS

Figure 7A:
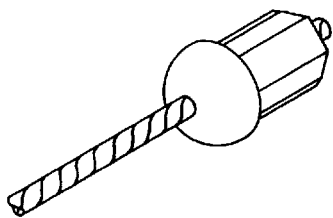
FIG. 7a is a perspective view of a conventional anchoring nipple attached to the end of a cable and having a semi-spherical engagement portion.
Figure 7B:
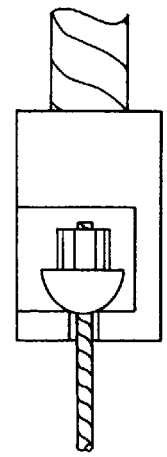
FIG. 7b is a partly-sectional plan view of the nipple of FIG. 7a disposed within an anchoring recess of a securing body.
Figure 8B:
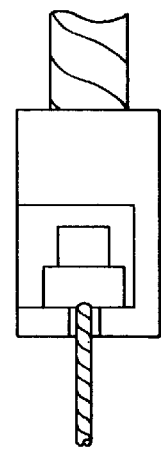
FIGS. 8b and 8c are partly sectional plan views of the anchoring nipple of 7a disposed within the recess of an anchoring body.
Figure 8A:
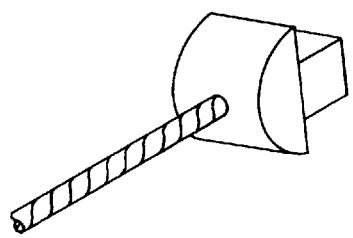
FIG. 8a is a perspective view of another conventional anchoring nipple attached to the end of a cable and having a semi-cylindrical engagement portion.
Figure 8C:
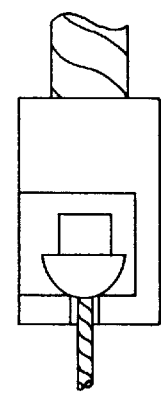

Referring to FIGS. 1–6 there is shown an anchoring structure for a cable end according to the presently preferred embodiment of the invention. The anchoring structure includes an anchoring nipple 2 fixed to an end of a cable or wire 1 and a securing body or buckle 4 having a recess 6 defined therein and which is shaped to receive the nipple 2. As shown, the anchoring nipple 2 preferably comprises a unitary member of steel, rigid plastic, etc. with two substantially cylindrical half portions joined together side-by-side such that the unitary member is substantially 8-shaped when viewed in the direction of the end faces of the substantially cylindrical half portions. Each of the substantially cylindrical half portions has a lateral width which is at least as large as a diameter thereof. The end 1 is fixed within an opening defined in a side wall of one of the cylindrical half portions such that the end of the wire 1 extends coaxially with a longitudinal axis of the nipple 2.

The buckle 4 is made of a rigid material such as molded plastic, and has an anchoring recess 6 defined therein and an opening 10 defined in upper and front surfaces thereof and extending into the recess 6. The recess 6 may be disposed within a front portion of the buckle and the buckle may be connected at a rear end portion to a strap 8 of an actuating mechanism, such as an electronic cruise control unit. The strap 8 may be formed of a flexible, durable material such as nylon and is controlled by the cruise control unit to move back-and-forth so as to correspondingly move the buckle 4, the nipple 2 and the cable 1 back-and-forth. An opposite end of the cable 1 (not shown) would be connected to an actuatable mechanism such as an accelerator cable, a throttle, etc.

The recess 6 within the buckle 4 preferably has an oblong, substantially elliptical shape with rounded ends when viewed from the side or from the ends of the substantially cylindrical half portions as shown. Additionally, the recess 6 preferably has a height just slightly greater than the diameter of the substantially cylindrical half portions of the nipple 2, a width somewhat greater than the width of the nipple, and a longitudinal length somewhat longer than the length of the nipple such that the nipple is fairly restricted to longitudinal sliding of movement when fully disposed within the recess. For example, the recess 6 may have a longitudinal length which is longer than the longitudinal length of the nipple by a distance which is less than the diameter of the half portions.

Such shapes of the nipple 2 and the recess 6 are very desirable and advantageous because they provide a relatively large or maximum contact surface area between the nipple and inner surfaces of the buckle defining the recess when the nipple is disposed in an operative position thereof within the recess such as shown in FIG. 6, which thereby reduces the average contact pressure for any given point of contact between the nipple and the buckle in comparison to conventional coupling structures; and because the shapes of the nipple and recess prevents the nipple from rotating about the longitudinal axis thereof when the nipple is fully, operatively disposed in the recess as shown in FIGS. 5 and 6, so that the nipple maintains its proper, operative position within the recess during normal operative movements of the cable 1. Essentially, the nipple 2 has a maximum length, width, and height to occupy as much space within the recess 6 as possible, while at the same time the nipple can still be easily manipulated to fit within or be removed from the recess.

As shown, the opening 10 in the buckle 4 is shaped to permit passage of the nipple 2 and the end of the cable 1 therethrough into the recess 6. Particularly, the opening 10 includes a larger portion in the upper surface of the buckle 4 which receives the nipple therethrough, and a smaller portion in the front side of the buckle 4 which extends continuously from larger portion and is shaped to receive the end of the cable 1 therethrough. As shown, the larger portion of the opening 10 is substantially square or rectangular with a length dimension somewhat larger than the diameter of each of the substantially cylindrical half portions of the nipple 2 and a width dimension just slightly larger than the width of the nipple 2. Such shape permits the nipple to be easily inserted into or withdrawn from the recess 6 as discussed further below in relation to FIGS. 3–6, but is sufficiently small to prevent the nipple from being inadvertently displaced out of the recess by normal operative movements of the cable 1 and the buckle 2.

Referring to FIGS. 3–6, there is shown a procedure of inserting the nipple 2 and the end of the cable 1 into the recess 6 of the buckle 4. Initially, in FIG. 3 the nipple is inserted substantially downwardly through the larger portion of the opening 10 into the recess 6 such that a front one of the substantially cylindrical half portions is fully disposed within the recess and a rear one of the substantially cylindrical portions of the nipple is partly disposed in the recess 6 and partly disposed within the opening 10. Then the nipple and the end of the cable are rotated downwardly, which rotating movement is facilitated by engagement between the front substantially cylindrical half portion and the rounded rear end of the recess 6, until the nipple is fully disposed within the recess 6 and the cable 1 extends substantially parallel to a lower surface of the buckle 4 as shown in FIGS. 4 and 5. Finally, the nipple 2 is slid forwardly within the recess such that a rear one of the substantially cylindrical half portions engages with the front rounded end of the recess 6 as shown in FIG. 6.

As understood best with reference to FIGS. 3 and 3a, the longitudinal dimension of the larger portion of the recess 10 is only large enough to permit the rear one of the substantially cylindrical half portions of the nipple to pivot downwardly therethrough when the front one of the half portions is in engagement with the rear rounded end of the recess 6. Relatedly the slight indentations in the upper and lower surfaces of the nipple 2 at the boundary between the substantially cylindrical portions is shaped to snugly engage the lower edge of the upper surface of the nipple having the opening 10 defined therein when the front one of the substantially cylindrical half portions is engaged with the rear end of the recess 6 (as shown in FIG. 4), which also permits the opening 10 to have a slightly reduced longitudinal dimension.

Although there has been described what is at present considered to be the preferred embodiment of the invention, it will be understood that variations and modifications may be made thereto without departing from the spirit or essence of the invention. The scope of the invention is, therefor, indicated by the appended claims rather than by the foregoing description of the presently preferred embodiment.

We claim:

1. An anchoring structure for a cable end, comprising:
   a securing body having a recess defined therein and having an opening defined through an outer surface thereof and extending into said recess;
   an anchoring nipple for being fixed to the cable end and fitted into the recess of the securing body through said opening; and
   said nipple comprising a unitary member with substantially cylindrical half portions joined abuttingly side-by-side such that the unitary member is substantially 8-shaped when viewed toward ends of said substantially cylindrical half portions.

2. An anchoring structure according to claim 1, wherein a lateral width of said nipple is at least as large as a diameter of said substantially cylindrical half portions.

3. An anchoring structure according to claim 1, wherein said anchoring nipple is adapted to be connected to the cable end at a side wall of one of said substantially cylindrical half portions such that the cable end extends coaxially with a longitudinal axis of said nipple.

4. An anchoring structure according to claim 1, wherein a height of said recess is slightly larger than a diameter of said substantially cylindrical half portions of said nipple, and a lateral width of said recess is slightly greater than a lateral width of said anchoring nipple such that the nipple cannot rotate about a longitudinal axis thereof when disposed in said recess.

5. An anchoring structure according to claim 4, wherein a longitudinal length of said recess is longer than a longitudinal length of said anchoring nipple such that said nipple is longitudinally slidable within said recess.

6. An anchoring structure according to claim 5, wherein the longitudinal length of said recess is longer than said longitudinal length of said anchoring nipple by a distance less than the diameter of said substantially cylindrical half portions.

7. An anchoring structure according to claim 1, wherein the cross-sectional shape of said opening of the anchoring body is smaller than a cross-sectional shape of said recess; and said opening has a larger portion for receiving said anchoring nipple therethrough and a smaller portion for receiving the end of the cable therethrough, and said smaller portion extends continuously from said larger portion.

8. An anchoring structure according to claim 7, wherein said larger portion of said opening has a substantially rectangular cross section with one dimension slightly larger than a diameter of said substantially cylindrical half portions of the nipple and another dimension slightly greater than a lateral width of the nipple.

9. An anchoring structure according to claim 1, wherein a longitudinal length of said nipple is at least as large as a combined depth of the larger portion of said opening and said recess.

10. An anchoring structure according to claim 9, wherein a front one of said substantially cylindrical half portions is adapted to pivotally engage with a rear end of said recess as a rear one of said cylindrical half portions rotates downwardly through said opening into said recess.

11. An anchoring structure according to claim 1, wherein longitudinal axes of said substantially cylindrical half portions extend substantially perpendicular to a longitudinal axis of said unitary member.

12. An anchoring structure for a cable end, comprising:
    a securing body having a recess defined therein and having an opening defined through an outer surface thereof and extending into said recess;
    an anchoring nipple for being fixed to the cable end and fitted into the recess of the securing body through said opening;
    said nipple comprising a unitary member with substantially cylindrical half portions joined side-by-side such that the unitary member is substantially 8-shaped when viewed toward ends of said substantially cylindrical half portions; and
    said recess has an oblong cross section extending parallel to a longitudinal axis of the recess and rounded ends shaped similar to outer surfaces of the substantially cylindrical half portions of the nipple.

13. An anchoring structure according to claim 12, wherein a height of said recess is slightly larger than the diameter of said substantially cylindrical half portions of the anchoring nipple, and a lateral width of said recess is slightly larger than a lateral width of said anchoring nipple.

14. An anchoring structure according to claim 13, wherein a longitudinal length of said recess is longer than a longitudinal length of said nipple by a distance less than the diameter of said substantially cylindrical half portions, and said nipple is longitudinally slidable within said recess.

15. An anchoring structure according to claim 12, wherein said rounded end faces of said recess are shaped to substantially fully engage said walls of said substantially cylindrical half portions, respectively.

16. An anchoring nipple for being fixed to the end of a cable such that the nipple and the end of the cable are anchorable to a securing body by being inserted into an oblong recess within the securing body, the anchoring nipple comprising:

a unitary member with a first substantially cylindrical half portion having an opening in a side wall thereof for receiving the end of the cable therein, and a second substantially cylindrical half portion joined abuttingly side-by-side to said first substantially cylindrical half portion such that the nipple is substantially 8-shaped when viewed toward ends of the half portions.

17. An anchoring nipple according to claim 16, wherein a lateral width of said nipple is at least as large as a diameter of said substantially cylindrical half portions.

18. An anchoring nipple according to claim 16, wherein said opening in the side wall of the first substantially cylindrical half portion extends coaxially with a longitudinal axis of said nipple.

19. An anchoring nipple according to claim 16, wherein longitudinal axes of said substantially cylindrical half portions extend substantially perpendicular to a longitudinal axis of said unitary member.

* * * * *

UNITED STATES PATENT AND TRADEMARK OFFICE
CERTIFICATE OF CORRECTION

PATENT NO  :  5,836,061
DATED      :  17 November 1998
INVENTOR(S):  Gilbert Castillo, Masahiro Izumi It is certified that error appears in the above-identified patent and that said Letters Patent is hereby corrected as shown below:

Column 1, line 50, change "to be" to --to the--.

Column 2, line 33, change "cylindrically" to --cylindrical--.

Column 3, line 1, change "non rotatable" to --non-rotatable--;
        line 35, after "FIG. 2" insert --is--.

Column 5, line 1, before "larger" insert --the--;
        line numbered between 51 and 52, change "therefor" to
    --therefore--.

Signed and Sealed this

Twenty-second Day of June, 1999

Attest:

Q. TODD DICKINSON

*Attesting Officer*            *Acting Commissioner of Patents and Trademarks*